United States Patent
Xiao et al.

(10) Patent No.: US 10,429,498 B2
(45) Date of Patent: Oct. 1, 2019

(54) VEHICLE POSITION DETECTING METHOD AND VEHICLE POSITION DETECTING SYSTEM

(71) Applicant: BROADWELL (SHENZHEN) TECHNOLOGY CO., LTD, Shenzhen, Guangdong (CN)

(72) Inventors: Long Xiao, Guangdong (CN); Qin Wang, Guangdong (CN); Feng Yang, Guangdong (CN)

(73) Assignee: BROADWELL (SHENZHEN) TECHNOLOGY CO., LTD, Shenzhen, Guangdong (CN)

( * ) Notice: Subject to any disclaimer, the term of this patent is extended or adjusted under 35 U.S.C. 154(b) by 304 days.

(21) Appl. No.: 15/502,444

(22) PCT Filed: Jul. 27, 2015

(86) PCT No.: PCT/CN2015/085239
§ 371 (c)(1),
(2) Date: Feb. 7, 2017

(87) PCT Pub. No.: WO2016/019818
PCT Pub. Date: Feb. 11, 2016

(65) Prior Publication Data
US 2017/0227631 A1    Aug. 10, 2017

(30) Foreign Application Priority Data
Aug. 7, 2014 (CN) .......................... 2014 1 0388102

(51) Int. Cl.
*G01S 13/04* (2006.01)
*G01S 15/04* (2006.01)
*G01S 17/02* (2006.01)

(52) U.S. Cl.
CPC .............. *G01S 13/04* (2013.01); *G01S 15/04* (2013.01); *G01S 17/026* (2013.01)

(58) Field of Classification Search
CPC .......... G01S 13/04; G01S 15/04; G01S 17/026
(Continued)

(56) References Cited

U.S. PATENT DOCUMENTS

| 2006/0111099 | A1* | 5/2006 | Abdel-Kader .... H04L 29/06027 455/421 |
| 2013/0217353 | A1* | 8/2013 | Snider .................. B60R 25/1025 455/404.2 |
| 2013/0217358 | A1* | 8/2013 | Snider .................... H04W 12/12 455/411 |

FOREIGN PATENT DOCUMENTS

| CN | 101470912 | 7/2009 |
| CN | 101661272 | 3/2010 |

(Continued)

OTHER PUBLICATIONS

International Search Report for international application No. PCT/CN2015/085239, dated Nov. 11, 2015 (6 pages including English translation).

Primary Examiner — Timothy X Pham
(74) Attorney, Agent, or Firm — Hamre, Schumann, Mueller & Larson, P.C.

(57) ABSTRACT

A vehicle position detecting method comprises: continuously detecting a detection region and generating a sensing signal by a sensor (S100); continuously determining whether a sudden change exists in the sensing signal, and starting timing when the sensing signal suddenly changes (S200); terminating timing after a preset time, if the sensing signal received at an end of timing does not restore to the sensing signal prior to the sudden change, confirming a vehicle is or is not in the detection region (S300); the sudden change is defined as a variation of the sensing signal per unit time (Continued)

exceeding a preset range. A vehicle position detecting system is also provided.

12 Claims, 4 Drawing Sheets

(58) Field of Classification Search
USPC ............................................ 455/27; 342/27
See application file for complete search history.

(56) References Cited

FOREIGN PATENT DOCUMENTS

| | | |
|---|---|---|
| CN | 101995576 | 3/2011 |
| CN | 202454089 | 9/2012 |
| CN | 202767601 | 3/2013 |
| CN | 203084191 | 7/2013 |
| CN | 103953252 | 7/2014 |
| CN | 104155645 | 11/2014 |
| CN | 204142955 | 2/2015 |
| JP | H0896298 | 4/1996 |
| JP | 10104361 | 4/1998 |

\* cited by examiner

VEHICLE POSITION DETECTING METHOD AND VEHICLE POSITION DETECTING SYSTEM

FIELD OF THE INVENTION

The present disclosure relates generally to the field of detection, and more specifically to a vehicle position detecting method and a vehicle position detecting system.

BACKGROUND OF THE INVENTION

There are many places where people need to confirm the location of the running vehicle. Take the garage in the mining area for example, the entrance of the garage in the mining area is usually equipped with automatic doors, when a system disposed outside the door for detecting the vehicle position by ultrasonic waves, infrared rays and so on detects a vehicle, the automatic door opens so that the vehicle can smoothly enter the garage. However, traditional systems for detecting vehicle position (for example, a system that relies on reflected waves to detect the vehicle position) are weak in vehicle accurate positioning perception function. Because reflecting surfaces of a vehicle body are not smooth or when a vehicle window is used as a reflecting surface, especially for large trucks of which there is a big gap between the cab and the container, reflected waves become intermittent, easily leading to the situation in which a vehicle is mistaken for multiple vehicles or it can not be confirmed.

SUMMARY

Therefore, it is necessary to provide a vehicle position detecting method and a vehicle position detecting system which can reduce the risk of misjudgment.

A method of detecting vehicle position includes:
continuously detecting, by a sensor, a detection region and generating a sensing signal;
continuously determining whether a sudden change exists in the sensing signal, and starting timing when the sensing signal suddenly changes; terminating timing after a preset time, if the sensing signal received at an end of timing does not restore to the sensing signal prior to the sudden change, confirming a vehicle is or is not in the detection region;
wherein the sudden change is defined as a variation of the sensing signal per unit time exceeding a preset range.

A vehicle position detecting system, includes a sensor, a timing module, and a processing module; wherein the sensor and the timing module are communicatively coupled to the processing module, respectively;
the sensor is configured to continuously detect a detection region and send a sensing signal to the processing module;
the processing module is configured to continuously receive the sensing signal and determine whether a sudden change exists in the sensing signal, and to send a timing start signal to the timing module when the sensing signal suddenly changes;
the timing module is configured to receive the timing start signal and start timing, and terminate timing after a preset time, and send a time-up signal to the processing module;
the processing module is further configured to receive the time-up signal, if the sensing signal received at the end of timing does not restore to the sensing signal prior to the sudden change, the processing module confirms a vehicle is or is not in the detection region;
wherein the sudden change is defined as a variation of the sensing signal per unit time exceeding a preset range.

When a sudden change is detected in the sensing signal, the foregoing vehicle position detecting method and vehicle position detecting system delay a preset time (for example, 0.5 seconds) and then confirm whether there is a vehicle entering or leaving the detection region. If the sensing signal received when the time delay terminates restores to the sensing signal prior to the sudden change, it can be confirmed that the state of the detection region remains the same state prior to the sudden change of the sensing signal, i.e., the no-vehicle state remains the no-vehicle state; and the vehicle-presence state remains the vehicle-presence state. By making decisions after delaying the preset time, misjudgments caused by, for example, passage of people or birds can be effectively avoided; and misjudgments caused by large trucks of which there is a big gap between the cab and the container, or misjudgments because that reflecting surfaces of the vehicle body are not smooth can also be effectively avoided.

BRIEF DESCRIPTION OF THE DRAWINGS

In order to more clearly illustrate the embodiments of the present disclosure or the technical solutions of the prior art, the drawings which are required to be used in the embodiments or the descriptions of prior art will be briefly described below. It will be apparent to those skilled in the art that the drawings in the following description are based on only some embodiments of the present disclosure, and the drawings of other embodiments can also be obtained from these drawings without making creative efforts.

DETAILED DESCRIPTION OF THE EMBODIMENTS

Embodiments of the disclosure are described more fully hereinafter with reference to the accompanying drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items.

Specific embodiments of the present disclosure will be described in detail hereinafter with reference to the accompanying drawings.

Figure 3:
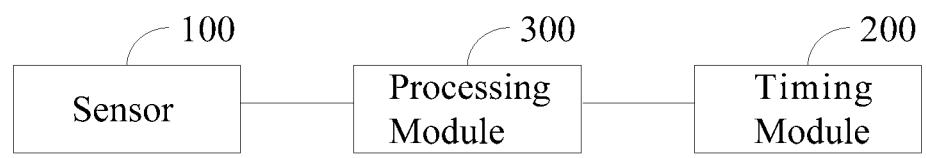
FIG. 3 is a block diagram of a vehicle position detecting system according to an embodiment.

FIG. 3 is a block diagram of a vehicle position detecting system according to an embodiment.

A vehicle position detecting system includes a sensor 100, a timing module 200, and a processing module 300. The sensor 100 and the timing module 200 are communicatively coupled to the processing module 300, respectively.

The sensor 100 is configured to continuously detect a detection region and send a sensing signal to the processing module 300.

In the illustrated embodiment, the sensor 100 employs an ultrasonic ranging sensor. The ultrasonic ranging sensor 100 continuously detects whether a vehicle is or is not in the detection region of the sensor. When there is no vehicle detected in the detection region, a distance detected by the ultrasonic ranging sensor 100 is a maximum range value thereof, thus the sensing signal output by the ultrasonic ranging sensor 100 is substantially the maximum range value; when there is a vehicle detected in the detection region, the distance detected by the ultrasonic ranging sensor 100 is a distance from the vehicle to the ultrasonic ranging sensor 100 (which is definitely much smaller than the maximum range), therefore the sensing signal output by the ultrasonic ranging sensor 100 will suddenly change.

In other embodiments, the sensor 100 may also employ an infrared ranging sensor, a radar ranging sensor, or a laser sensor.

The processing module 300 is configured to continuously receive the sensing signal and determine whether a sudden change exists in the sensing signal, and send a timing start signal to the timing module 200 when the sensing signal suddenly changes. For example, the sensing signal received by the processing module 300 is always the maximum range value, suddenly it finds that a sudden change exists in the received sensing signal (changing to a value much smaller than the maximum range value in a short time), and thus the processing module 300 sends the timing start signal to the timing module 200 to start timing. Typically, the definition of the sudden change in the sensing signal can be determined by a numerical range set by a program. The sudden change is defined as a variation of the sensing signal per unit time exceeding a preset range. For example, if the received sensing signal is always the maximum range of 10 meters, it can be set that when the received sensing signal changes by more than 10 cm in 0.1 s, it is recognized as a sudden change, i.e., the sudden change is defined as a variation of the sensing signal per unit time exceeding a preset range of (−10 cm/0.1 s, 10 cm/0.1 s). Of course, the preset range can be adjusted as needed.

The timing module 200 is configured to receive the timing start signal and start timing, and terminate timing after a preset time, and send a time-up signal to the processing module 300. The timing module 200 is mainly used for time delay. Taking the relationship between a speed of a large truck and a gap between the cab and the container of the large truck into consideration, the preset time can be set to 0.5 s (enough for ignoring the gap between the cab and the container of a vehicle, and the passage of, for example, people or birds). Of course, the preset time can vary as needed, for example, between 0.5 s and 1 s. But the preset time can not be too long, otherwise it may leads to misjudgment when the body of a vehicle is short and the speed of the vehicle is fast.

In other embodiments, if the sensing signal received prior to the end of timing by the processing module 300 restores to the sensing signal prior to the sudden change, a timing end signal will be send to the timing module 200. The timing module 200 receives the timing end signal and terminates timing when the timing end signal is received. Namely, if the sensing signal received by the processing module 300 restores to the sensing signal prior to the sudden change in a time delay process, the timing module 200 is immediately controlled to terminate the time delay and re-detect. For example, a sensing signal has been received being a maximum range of 10 meters, and the sensing signal after a sudden change is only continuously produced for 0.2 s, and then the sensing signal restores to 10 meters, thus it can be concluded that there may be a person or birds that passed by, therefore the timing can be terminated immediately. Of course, the restoration of the sensing signal to the value prior to the sudden change is not necessarily to restore to the exact value prior to the sudden change, a certain error range may be allowed.

The processing module 300 is further configured to receive the time-up signal. If the sensing signal received at the end of timing does not restore to the sensing signal prior to the sudden change, confirm a vehicle is or is not in the detection region.

When the time delay is over, if the sensing signal received by the processing module 300 is still the sensing signal after the sudden change without restoring to the sensing signal prior to the sudden change, there is a vehicle entering or a vehicle leaving. For example, the sensing signal received by the processing module 300 is always the maximum range value (10 meters), and suddenly it is detected that a sudden change exists in the received sensing signal (changing to a value much smaller than the maximum range value in a short time), then the processing module 300 send a timing start signal to the timing module 200 and start the time delay. When the time delay is over, if the sensing signal received by the processing module 300 is still the sensing signal after the sudden change without restoring to the sensing signal prior to the sudden change, it is confirmed that a vehicle has entered the detection region, and the vehicle is in the detection region; furthermore, a sensor signal received by the processing module 300 is always 2 meters (which proves that a vehicle is passing by), and then suddenly it is detected that a sudden change exists in the received sensing signal (changing to 10 meters in a short time), then send a timing start signal to the timing module 200 to start time delay. When the time delay is over, if the sensing signal received by the processing module 300 is still the sensing signal after the sudden change without restoring to the sensing signal prior to the sudden change, it is confirmed that the vehicle has left the detection region, and there is no vehicle in the detection region.

The received sensing signal is processed after the processing module 300 confirmed whether there is a vehicle entering or leaving the detection region. When no vehicle is detected in the detection region, a high-level signal (an acknowledge signal) is output, when a vehicle is detected in the detection region, a low-level signal (an acknowledge signal) is output, and then the high-level signal and the low-level signal are used for other functions such as turning on or off a garage door. In other embodiments, it is also possible to output a low-level signal when no vehicle detected in the detection region and to output a high-level signal when a vehicle is detected in the detection region.

Figure 4:
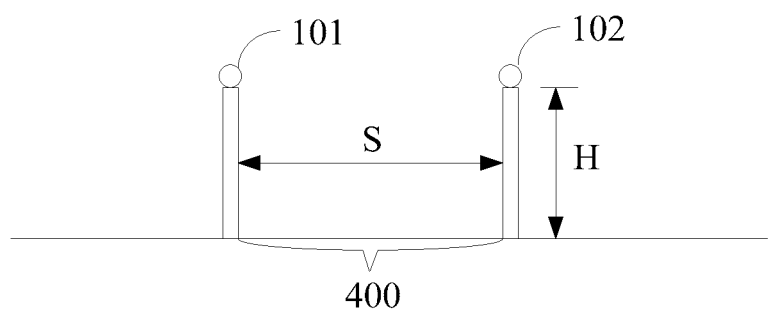
FIG. 4 is a block diagram of a vehicle position detecting system according to another embodiment.

Referring to FIG. 4, in other embodiments, more than one sensor may be used, such as using two sensors (sensor 101 and sensor 102) that are spaced apart from each other by a predetermined distance. When any one of the two sensors confirms a vehicle is in the detection region, it is confirmed that the vehicle arrives at the designated region 400. When both sensors confirm no vehicle is in the detection region, it is confirmed that no vehicle is in the designated region 400. For example, when a vehicle passes by the sensor 101, the sensing signal is stabilized (the processing module 300 acknowledges that after a time delay) to obtain an acknowledgment signal for confirming the passage of the vehicle by the sensor 101. When the vehicle reaches the sensor 102, the sensing signal is stabilized to obtain an acknowledgment signal for confirming the passage of the vehicle by the sensor 102. As long as any acknowledgment signal of the sensor is obtained, the vehicle is deemed to reach the designated region 400. When the acknowledgment signals of the two sensors are successively canceled, the vehicle is deemed to have left the designated region 400.

The predetermined distance can be greater than 2 meters, a height H of the sensor from the plane on which a vehicle travels is greater than 1.9 m, such that the interference from people passing by can be avoided. Using multi-sensors to cooperate with each other, location of a running vehicle can be accurately confirmed, and some interference signal can be eliminated, which leads to more accurate and stable confirmed results.

When detecting a sudden change in the sensing signal, the foregoing vehicle position detecting system delays a preset time (for example, 0.5 seconds) and then confirms whether there is a vehicle entering or leaving the detection region. If the sensing signal received by the processing module 300 restores to the sensing signal prior to the sudden change when time delay terminates, it can be confirmed that the state of the detection region remains the same state prior to the sudden change of the sensing signal, i.e., the no-vehicle state remains the no-vehicle state; and the vehicle-presence state remains the vehicle-presence state. If the detected sensing signal restores to the sensing signal prior to the sudden change in a time delay process, terminate the time delay, and confirm that the interfering object has passed, and re-detect. By making decisions after delaying the preset time, misjudgments caused by, for example, passage of people or birds can be effectively avoided; and misjudgments caused by large trucks of which there is a big gap between the cab and the container, or misjudgments because that reflecting surfaces of the vehicle body are not smooth can also be effectively avoided.

A vehicle position detecting method is further described below.

Figure 1:
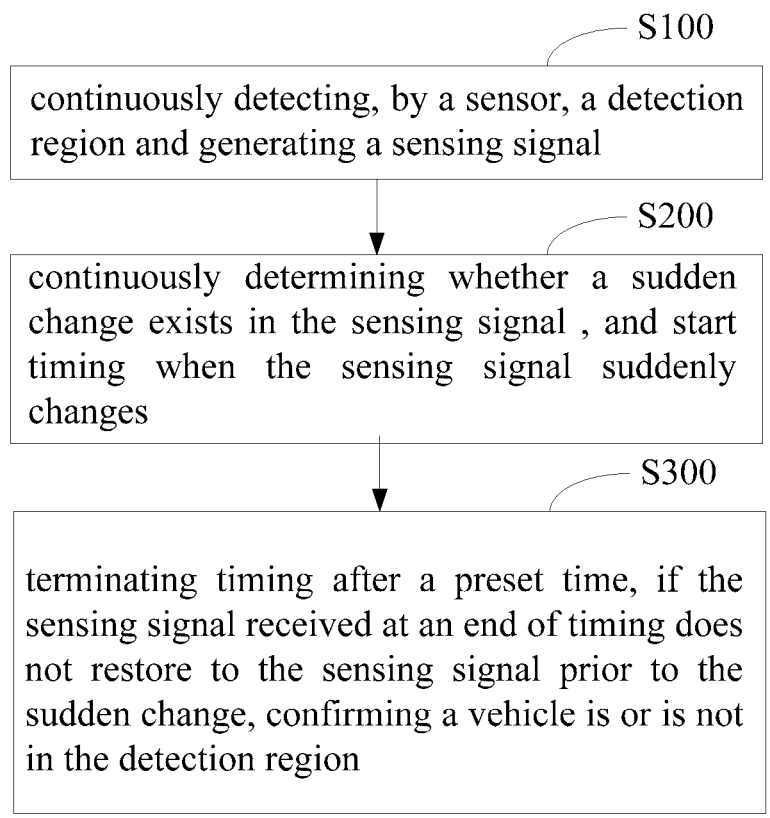
FIG. 1 is a flow chart of a vehicle position detecting method according to an embodiment.

FIG. 1 is a flow chart of a vehicle position detecting method.

In step S100, the sensor continuously detects the detection region and generates a sensing signal. The ultrasonic ranging sensor continuously detects whether a vehicle is or is not in the detection region of the sensor. When there is no vehicle detected in the detection region, a distance detected by the ultrasonic ranging sensor is a maximum range value thereof, thus the sensing signal output by the ultrasonic ranging sensor is substantially the maximum range value; when there is a vehicle detected in the detection region, the distance detected by the ultrasonic ranging sensor is a distance from the vehicle to the ultrasonic ranging sensor (which is definitely much smaller than the maximum range), therefore the sensing signal output by the ultrasonic ranging sensor will suddenly change.

In step S200, continuously determine whether a sudden change exists in the sensing signal, and start timing when a suddenly changed sensing signal is received for the first time. Continuously determine whether a sudden change exists in the sensing signal, and start timing when the sensing signal suddenly changes. For example, the received sensing signal is always the maximum range value, suddenly it finds that a sudden change exists in the received sensing signal (changing in a short time to a value much smaller than the maximum range value), and thus start the timing. Typically, the definition of the sudden change in the sensing signal can be determined by a numerical range set by a program. The sudden change is defined as a variation of the sensing signal per unit time exceeding a preset range. For example, if the received sensing signal is always the maximum range of 10 meters, it can be set that when the received sensing signal changes by more than 10 cm in 0.1 s, it is recognized as a sudden change, i.e., the sudden change is defined as a variation of the sensing signal per unit time exceeding a preset range of (−10 cm/0.1 s, 10 cm/0.1 s). Of course, the preset range can be adjusted as needed.

In other embodiments, if the sensing signal received prior to the end of timing restores to the sensing signal prior to the sudden change, terminates timing. Namely, if the received sensing signal is found to restore to the sensing signal prior to the sudden change in a time delay process, terminate the time delay and re-detect. For example, a sensing signal has been received being a maximum range of 10 meters, and the sensing signal after the sudden change is only continuously produced for 0.2 s, and then the sensing signal restores to 10 meters, thus it can be concluded that there may be a person or birds that passed by, therefore the timing can be terminated immediately. Of course, the restoration of the sensing signal to the value prior to the sudden change is not necessarily to restore to the exact value prior to the sudden change, a certain error range may be allowed.

In step S300, terminate timing after a preset time, if the sensing signal received at the end of timing does not restore to the sensing signal prior to the sudden change, confirm a vehicle is or is not in the detection region. When the time delay is over, if the received sensing signal is still the sensing signal after the sudden change without restoring to the sensing signal prior to the sudden change, there is a vehicle entering or a vehicle leaving. For example, a received sensing signal is always the maximum range value (10 meters), and suddenly it is detected that a sudden change exists in the received sensing signal (changing to a value much smaller than the maximum range value in a short time), then start time delay. When the time delay is over, if the received sensing signal is still the sensing signal after the sudden change without restoring to the sensing signal prior to the sudden change, it is confirmed that a vehicle has entered the detection region, and the vehicle is in the detection region; furthermore, a received sensor signal is always 2 meters (which proves that a vehicle is passing by), and then suddenly it is detected that a sudden change exists in the received sensing signal (changing to 10 meters in a short time), then start timing and the time delay begins. When the time delay is over, if the received sensing signal is still the sensing signal after the sudden change without restoring to the sensing signal prior to the sudden change, it is confirmed that the vehicle has left the detection region, and there is no vehicle in the detection region.

Taking the relationship between a speed of a large truck and a gap between the cab and the container of the large truck into consideration, the preset time can be set to 0.5 s (enough for ignoring the gap between the cab and the container of a vehicle, and the passage of, for example, people or birds). Of course, the preset time can vary as needed, for example, between 0.5 s and 1 s. But the preset time can not be too long, otherwise it may leads to misjudgment when a body of a vehicle is short and a speed of the vehicle is fast.

The received sensing signal is processed after it is confirmed that whether there is a vehicle entering or leaving the detection region. When no vehicle is detected in the detection region, a high-level signal (an acknowledge signal) is output, when a vehicle is detected in the detection region, a low-level signal (an acknowledge signal) is output, and then the high-level signal and the low-level signal are used for other functions such as turning on or off a garage door. In other embodiments, it is also possible to output a low-level signal when no vehicle is detected in the detection region and to output a high-level signal when a vehicle is detected in the detection region.

Figure 2:
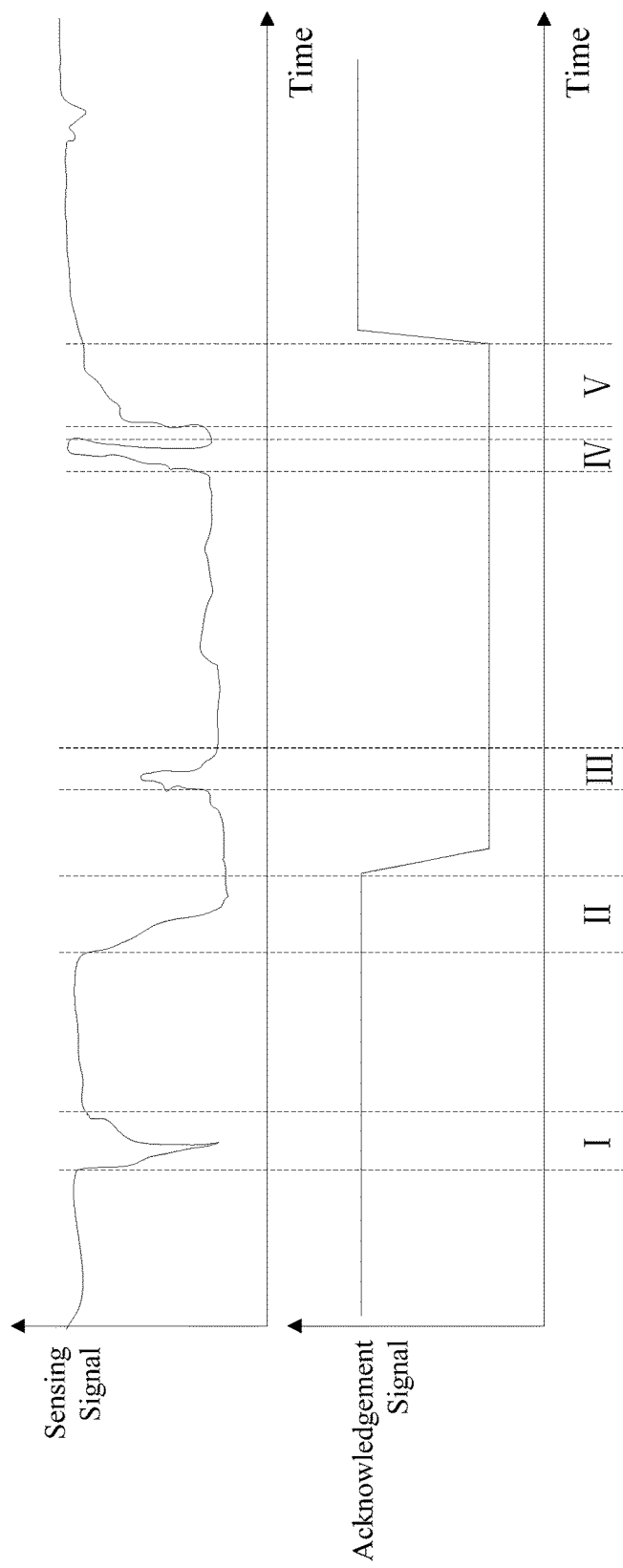
FIG. 2 is a diagram illustrating a sensing signal and an output acknowledgment signal according to an embodiment.

FIG. 2 is a diagram illustrating a sensing signal and an output acknowledgment signal according to an embodiment.

The x-coordinates represent time; the y-coordinates represent the sensing signal and transformed acknowledgment signal, respectively. When there is no vehicle passing by, a distance detected by the sensor is a maximum range value thereof. Region I represents for the state of people passing by the sensor, when the received sensing signal suddenly changes, the output acknowledgment signal remains to be high-level signal for the time being, start the time delay. People leave in 0.5 s, and the sensing signal restores to the value prior to its sudden change, so the output acknowledgment signal remains to be high-level signal. In region II, vehicles enter the detection region, and the sensor detects a change in distance. After a delay of 0.5 s, it is confirmed that the vehicle has passed and the output acknowledgement signal changes to the low-level signal. In region III, a big gap between the cab and the container of a vehicle passes through the detection region, and the sensing signal suddenly changes. But within 0.5 s the container of the vehicle reaches the detection region, the acknowledgment signal output by the sensor remains to be low-level. In the region IV, since the shape of the vehicle body absorbs the reflected wave, the sensor can not detect the vehicle, and the sensor signal suddenly changes. But because the sudden change only occurs within 0.5 s, the acknowledgement signal output by the sensor remains low-level. In the region V, the vehicle leaves from the detection region, and the sensor signal restores to its original value. After a delay of 0.5 s, the output acknowledge signal restores to the high-level signal prior to the sudden change. After the passage of the entire vehicle, a complete detection process is complete.

When detecting a sudden change in the sensing signal, the foregoing vehicle position detecting method delays a preset time (for example, 0.5 seconds) and then confirms whether there is a vehicle entering or leaving the detection region. If the sensing signal received when the time delay terminates restores to the sensing signal prior to the sudden change, it can be confirmed that the state of the detection region remains the same state prior to the sudden change of the sensing signal, i.e., the no-vehicle state remains the no-vehicle state; and the vehicle-presence state remains the vehicle-presence state. If the detected sensing signal restores to the sensing signal prior to the sudden change in a time delay process, terminate the time delay, and confirm that the interfering object has passed, and re-detect. By making decisions after delaying the preset time, misjudgments caused by, for example, passage of people or birds can be effectively avoided; and misjudgments caused by large trucks of which there is a big gap between the cab and the container, or misjudgments because that reflecting surfaces of the vehicle body are not smooth can also be effectively avoided.

In other embodiments, more than one sensor may be used, such as using two sensors (sensor 1 and sensor 2) that are spaced apart from each other by a predetermined distance. When any one of the two sensors confirms the vehicle is in the detection region, it is confirmed that the vehicle arrives at the designated region. When both sensors confirm no vehicle is in the detection region, it is confirmed that no vehicle is in the designated region. For example, when a vehicle passes by the sensor 1, the sensing signal is stabilized (acknowledged that after a time delay) to obtain an acknowledgment signal for confirming the passage of the vehicle by the sensor 1. When the vehicle reaches the sensor 2, the sensing signal is stabilized to obtain an acknowledgment signal for confirming the passage of the vehicle by the sensor 2. As long as any acknowledgment signal of the sensor is obtained, the vehicle is deemed to reach the designated region. When the acknowledgment signals of the two sensors are successively canceled, the vehicle is deemed to have left the designated region.

The predetermined distance can be greater than 2 meters, a height of the sensor from the plane on which a vehicle travels is greater than 1.9 m, such that the interference from people passing by can be avoided. Using multi-sensors to cooperate with each other, location of a running vehicle can be accurately confirmed, and some interference signal can be eliminated, which leads to more accurate and stable confirmed results.

It is to be understood that although the steps in the flowchart of FIG. 1 are sequentially displayed in accordance with the directions of arrows, these steps are not necessarily executed in the order indicated by the arrows. Unless expressly stated herein, the execution of these steps is not strictly limited in order and may be performed in other orders. And at least one portion of the steps in FIG. 1 may include a plurality of sub-steps or stages that do not necessarily have to be performed at the same time, but may be executed at different times, and the order of execution is not necessarily be sequential, they may be alternately performed with at least one portion of a stage, or sub-steps of other steps, or other steps.

The foregoing implementations merely describe several embodiments of the present disclosure in detail, which should not be deemed as limitations to the scope of the present disclosure. It should be noted that without leaving from the concept of the present disclosure, a number of modifications and variations can be made by those skilled in the art, and they shall all fall within the scope of the present disclosure. Therefore, the scope of the present disclosure shall be defined by the appended claims.

What is claimed is:

1. A method of detecting vehicle position, comprising:
   continuously detecting, by a sensor, a detection region and generating a sensing signal;
   continuously determining by a processor whether a sudden change exists in the sensing signal, and starting timing when the determined sensing signal suddenly changes;
   terminating timing after a preset time;
   at an end of the preset time, if the determined sensing signal does not restore to the determined sensing signal prior to the sudden change, confirming a vehicle is or is not in the detection region;
   wherein the sudden change is defined as a variation of the sensing signal per unit time exceeding a preset range.

2. The method of claim 1, further comprising: before the end of the preset time, terminating timing if the determined sensing signal restores to the sensing signal prior to the sudden change.

3. The method of claim 1, wherein when no vehicle is detected in the detection region, a high-level signal is output; and when the vehicle is detected in the detection region, a low-level signal is output.

4. The method of claim 1, wherein when no vehicle is detected in the detection region, a low-level signal is output; and when the vehicle is detected in the detection region, a high-level signal is output.

5. The method of claim 1, wherein the preset time is from 0.5 s to 1 s.

6. The method of claim 1, further comprising two sensors, wherein the two sensors are spaced apart from each other by a predetermined distance to form a designated region;

when any one of the two sensors confirms the vehicle is in the detection region, confirming the vehicle arrives at the designated region;

when both sensors confirm no vehicle is in the detection region, confirming no vehicle is in the designated region.

7. A vehicle position detecting system, comprising a sensor, a timer, and a processor; wherein the sensor and the timer are communicatively coupled to the processor, respectively;

the sensor is configured to continuously detect a detection region and send a sensing signal to the processor;

the processor is configured to continuously receive the sensing signal and determine whether a sudden change exists in the sensing signal, and to send a timing start signal to the timer when the sensing signal suddenly changes;

the timer is configured to receive the timing start signal and start timing, and terminate timing after a preset time, and send a time-up signal to the processor;

the processor is further configured to receive the time-up signal, at an end of the preset time, if the sensing signal received does not restore to the sensing signal received prior to the sudden change, the processor confirms a vehicle is or is not in the detection region;

wherein the sudden change is defined as a variation of the sensing signal per unit time exceeding a preset range.

8. The vehicle position detecting system of claim 7, wherein the processor is further configured to send a timing end signal to the timer if the sensing signal received prior to receiving the time-up signal restores to the sensing signal prior to the sudden change;

the timer is further configured to receive the timing end signal and terminate timing when the timing end signal is received.

9. The vehicle position detecting system of claim 7, wherein the sensor is one of an infrared ranging sensor, a radar ranging sensor, and a laser sensor.

10. The vehicle position detecting system of claim 7, wherein a height of the sensor from a plane on which the vehicle travels is greater than 1.9 m.

11. The vehicle position detecting system of claim 7, further comprising two sensors, wherein the two sensors are spaced apart from each other by a predetermined distance and form a designated region, when any one of the two sensors confirms the vehicle is in the detection region, confirming the vehicle arrives at the designated region;

when both sensors confirm no vehicle is in the detection region, confirming no vehicle is in the designated region.

12. The vehicle position detecting system of claim 11, wherein the predetermined distance is greater than 2 meters.

* * * * *